United States Patent Office 3,527,833
Patented Sept. 8, 1970

3,527,833
PROCESS FOR THE ISOMERIZATION OF BUTENE-2
William L. Kehl, Indiana Township, Allegheny County, Raymond J. Rennard, Jr., O'Hara Township, Allegheny County, and Harold E. Swift, Gibsonia, Pa., assignors to Gulf Research & Development Company, Pittsburgh, Pa., a corporation of Delaware
No Drawing. Filed May 28, 1969, Ser. No. 828,712
Int. Cl. C07c 5/22
U.S. Cl. 260—683.2                                7 Claims

ABSTRACT OF THE DISCLOSURE

Butene-2 is isomerized to butene-1 at elevated temperatures in the presence of a magnesium chromium ferrite catalyst.

The present invention relates to a process for the isomerization of butene-2 to butene-1 using a magnesium chromium ferrite catalyst.

Butene-2 is obtained as a product of petrolem refining and chemical conversion processes. For example, in the process for the diproportionation of propylene, ethylene and butene-2 are produced. However, butene-1 is generally more desired as a reactant than butene-2 because of the greater reactivity of butene-1 and the greater demand for its reaction products. For example, butene-1 can be epoxidized and then be converted to butanol, butanol-1 or butyric acid. Also, it is much easier to polymerize butene-1 that butene-2 and buten-1 can be dimerized to 2-ethyl-1-hexene which is a desirable plasticizer intermediate. Therefore, the conversion of butene-2 to butene-1 would represent an upgrading of butene-2 for many applications. Titanium trichloride and an organo-aluminum compound have separately been proposed as catalysts for this reaction.

We have discovered as the basis of our invention a novel and economical process for isomerizing butene-2. In our process the butene-2 is passed through a bed of a magnesium chromium ferrite catalyst at an elevated temperature. In the preferred operation steam is present as a significant constituent of the feed stream, since it has been observed that the catalyst life is enhanced when steam is present in the feed stream. The reaction is preferably carried out in an oxygen-free atmosphere although a minor amount of oxygen can be tolerated in the feed stream. Since oxygen effects a significant reduction in the selectivity of the desired reaction, it is important that the amount of oxygen be kept small that is, no greater than about 0.15 mols per mol of butene-2.

We prefer to carry out our isomerization procedure at a temperature from about 400° C. to about 485° C. although the broader range of about 400° C. to about 550° C. will result in significant amounts of the desired butene-1. A lower temperature results in a low conversion and selectivity to butene-1 while higher temperatures result in high conversions with a tendency to produce cracked products. At the optimum temperatures we find that equilibrium conversion conditions are superior for the production of butene-1.

As indicated, steam is preferably included in the feed stream to help prevent aging of the catalyst. The amount of steam that is utilized can vary from about five to about 20 mols per mol of butene-2 and preferably from about seven to about 15 mols per mol of butene-2. It is believed that the steam in the feed stream delays catalyst aging by preventing the deposition of coke on the catalyst or by removing coke from the catalyst after it is deposited. Another gas such as nitrogen, helium, argon, methane, ethane, carbon dioxide and the like can be used as an inert diluent for the butene-2. The effect of this diluent is to increase selectivity to butene-1 at the expense of conversion. These gases are less desirable than steam.

Oxygen is preferably totally excluded from the reaction gas stream. However, it may be advantageous in some instances to add minor amounts of oxygen to the feed stream to supply heat for the desired reaction by the partial oxidation of the butene-2, but as indicated, this results in a significant reduction in the selectivity of the reaction to butene-1. The oxygen content can vary from 0 to about 0.15 mol per mol of butene-2 and preferably no greater than about 0.10 mol per mol of butene-2.

The magnesium chromium ferrite catalyst is preferably used as a fixed bed catalyst with the reacting gas stream passed through it in either an upflow or downflow operation. This reaction gas stream is flowed through the catalyst bed at a gas hourly space velocity based on butene-2 of about 300 to about 2000 and preferably from about 450 to about 1300 for best overall results. Pressure does not appear to be a significant factor in this reaction. We find that a pressure from about 0.5 to about 50 p.s.i.g. is convenient.

The catalysts useful in the present invention are magnesium chromium ferrites containing, as the active components thereof, magnesium, chromium and iron cations in a single phase partially inverted spinel compound. Magnesium has a stronger octahedral site stabilization energy than the trivalent iron, and when these are combined in accordance with the present invention, the result is a partially inverted spinel in which a significant number of the magnesium cations tend to occupy octahedral sites and a corresponding number of iron cations are displaced into tetrahedral sites. The catalyst can be employed in the form of the homogeneous magnesium chromium ferrite, per se, or as a heterogeneous composition containing a mixture of the oxides of said cations and the single phase partially inverted spinel compound.

The catalyst employed in the present invention can be represented by the empirical formula $Mg_xCr_yFe_zO_4$ wherein $x$ can vary within the range of about 0.1 to about 3, $y$ can vary from greater than 0 to less than 2 and $z$ can vary from greater than 0 to less than 3. In a preferred form of the catalyst $x$ can vary within the range of about 0.1 to 2.0, $y$ can vary from about 0.1 to about 1.8 and $z$ can vary from about 0.25 to about 1.9 while in a more preferred arrangement $x$ can vary from about 0.8 to about 1.3, $y$ can vary from about 0.2 to about 1.5 and $z$ can vary from about 0.5 to about 1.8. In the most preferred form of the catalyst $x$ is about 1.0.

In the homogeneous structure all of the elements are located in a single phase magnesium chromium ferrite compound. Since magnesium possesses a high octahedral site stabilization energy, a substantial amount of the magnesium will be in octahedral sites and a corresponding amount of iron will be in tetrahedral sites. Since localized irregularities and non-stoichiometric relationships will occur in the lattice of homogenerous magnesium chromium ferrite as actually prepared, $x$ is about 1.0 and the sum of $y+z$ is about 2.0.

In the heterogeneous composition, also represented by the empirical formula $Mg_xCr_yFe_zO_4$, there will be present the single phase magnesium chromium ferrite compound as well as one or more oxides (or combined oxides) of one or more of the constituent cations. For example, if in the empirical composition $x$ is about 3, the catalyst will contain a major amount of magnesium oxide and a minor amount of a magnesium chromium ferrite compound. In this instance the composition will possess catalytic activity due to the magnesium chromium ferrite compound with magnesium oxide serving essentially as an inert diluent. Chromium and iron oxides, if present, may not be inert, i.e., they will have some activity for the desired reaction but with lower selectivity to the desired reaction. The homogeneous material can only result when $x$ is 1.0 or about 1.0. When $x$ deviates significantly from 1.0, the material is heterogeneous.

The magnesium chromium ferrites can be conveniently prepared by employing as starting materials salts of magnesium, chromium and iron, in which salts the metals are contained as cations. Any such salt of said metals is satisfactory, however, it is preferred to employ inorganic salts of the metals, such as, for example, nitrates, carbonates, acetates and halides. These salts containing the metals as cations are then admixed with a basic reactant in order to precipitate the precursor of the final product. It is necessary to maintain this addition mixture at a high pH—above about 8, and preferably above about 9. It is considered preferable to vigorously stir the metal salts in order to reduce any pH gradients through said addition mixture.

In order to prevent the inclusion in the precursor, and thus in the final product, of any contaminant it is essential that either a volatilizable base or a base containing no deleterious contaminants such as, for example, sodium be employed. Any base which can be vaporized readily under the conditions used for drying and calcining can be employed, such as, for example, ammonium carbonate, ammonium bicarbonate and ammonium hydroxide. It is considered preferable, however, to employ an aqueous ammonia solution as the volatilizable base.

After precipitation, advantageously the precursor is washed, again at a pH above about 8, and preferably above about 9, and then dried and calcined. This drying and calcining can effectively be accomplished by any of the techniques well known in the art. Generally, drying can be accomplished at temperatures from about 100° C. to about 150° C. for a period of from about four to about 60 hours while calcining can be effected at temperatures ranging from about 350° C. to about 800° C. for a period of from about two to 16 hours.

It has been found that the catalysts of the present invention can be conveniently prepared by forming aqueous solutions of salts of the respective cations, magnesium, chromium and iron, preferably the nitrate salts thereof, and admixing said solutions with an aqueous ammonium hydroxide solution at a pH above about 8, preferably between a pH of from about 8.5 to about 8.9, thereby co-precipitating the hydroxides of the cations. The resulting precipitate can then be washed, filtered, dried and calcined to yield the finished bulk catalyst.

The catalyst can be employed with or without a filler or carrier material and can be pelletized or formed employing conventional techniques. Suitable carrier materials are, for example, rough granular aluminas, zirconias, granular silicon carbide and other similar inert materials. Supported catalysts can be prepared by thoroughly mixing the granular particles of the carrier material with a thick wet slurry of the washed mixture of combined precipitates prior to drying and calcining. The sluried mixture can thereafter be dried at about 120° C. and calcined at about 650° C. to provide granular particles of the supported catalyst.

We now describe by way of specific examples the use of our invention, however, these examples are not to be construed in any manner as limiting our invention.

EXAMPLE 1

A mixture of 6.4 grams of 10 to 20 mesh $MgCrFeO_4$, having a surface area of 33 $M^2/g$., and an equal volume of silicon carbide was placed in a ¾ inch stainless steel reactor. The reactor was heated by an electric furnace and internal temperatures were measured by means of a concentric thermocouple well running the length of the reactor. A mixture of butene-2 and steam in a molar ratio of 1 to 10 was passed over the catalyst at a temperature of 465° C. and a gas hourly space velocity of 600 based on the butene-2. The reaction resulted in a 25 percent conversion of the butene-2 with 89.5 percent selectivity to butene-1, the remainder primarily was butadiene. This level of activity was maintained for approximately 15 hours, after which it started to decline. The original activity was regained by heating the catalyst for five minutes in air at reaction temperature.

EXAMPLE 2

Several runs were carried out using the same feed gas mixture, catalyst and reaction conditions including temperature as used in Example 1 except that minor amounts of oxygen were added to the feed gas mixture. Table I sets forth the conversion of butene-2 and the selectivity to butene-1 for these runs as well as for Example 1.

TABLE I

| $O_2$/butene-2 molar ratio | Butene-2 conversion, percent | Selectivity to butene-1, percent |
|---|---|---|
| 0.50 | 49 | 27.0 |
| 0.20 | 37 | 51.6 |
| 0.10 | 33 | 69.0 |
| 0 | 25 | 89.5 |

This example demonstrates the significant detrimental effect of oxygen in the feed gas stream on the selectivity of the reaction to butene-1. Carbon dioxide and butadiene are the primary products other than butene-1 when oxygen is present.

EXAMPLE 3

A 7.2 gram sample of 10 to 20 mesh magnesium chromium ferrite having the empirical formula $MgCr_{.5}Fe_{1.5}O_4$ with a surface area of 17 $M^2/g$. was mixed with an equal volume of 10 to 20 mesh silicon carbide. This mixture was placed into the reactor as used in Example 1 and a butene-2 and steam mixture was passed through the reactor with all conditions including temperature being identical to the conditions used in Example 1. A butene-2 conversion of 22.4 percent with an 87.5 percent selectivity to butene-1 was obtained.

EXAMPLE 4

The same catalyst mixture as described in Example 3 was used and Example 2 was repeated, that is oxygen was introduced into the feed stream in varying amounts. The total conversion of butene-2 and the selectivity to butene-1 for these oxygen runs as well as for Example 3 are set forth in Table II.

TABLE II

| $O_2$/butene-2 molar ratio | Butene-2 conversion, percent | Selectivity to butene-1, percent |
|---|---|---|
| 0.67 | 53 | 20 |
| 0.20 | 38 | 51 |
| 0.10 | 33 | 69 |
| 0 | 22.4 | 87.5 |

EXAMPLE 5

A 4.4 gram sample of 10 to 20 mesh magnesium chromium ferrite having the empirical formula

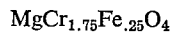

$MgCr_{1.75}Fe_{.25}O_4$ with a surface area of 52 $M^2/g$. was mixed with an equal volume of 10 to 20 mesh silicon carbide. This mixture was placed into the reactor as used in Example 1 and a butene-2 and steam mixture was passed through the reactor with all conditions including temperature being identical to the conditions used in Example 1. A butene-2 conversion of 26.1 percent with a selectivity of 95.4 percent of butene-1 was obtained.

EXAMPLE 6

The same catalyst mixture as described in Example 5 was used in a series of runs in which oxygen was introduced into the feed stream in varying amounts. All conditions were identical to those used in Example 1 except for the temperature and for the presence of oxygen in the feed stream. Table III sets forth the temperature, oxygen content of the feed stream, total conversion of butene-2 and its selectivity to butene-1 for these runs and also for Example 5.

TABLE III

| Temp.° C. | O$_2$/butene-2 molar ratio | Butene-2 conversion, percent | Selectivity to butene-1 |
|---|---|---|---|
| 375 | 0.67 | 20.6 | 12.1 |
| 400 | 0.67 | 30.7 | 12.4 |
| 465 | 0.20 | 34.3 | 64.1 |
| 465 | 0.10 | 32 | 78 |
| 465 | 0 | 26.1 | 95.4 |

These runs demonstrate that the yield of butene-1 is insignificant at low temperatures and high oxygen to butene-2 ratios. At higher temperatures and an oxygen to butene-2 ratio of no greater than 0.15, the selectivity to butene-1 is at least 70 percent.

Results equivalent to those specifically set forth herein are also obtained when other catalysts described by the above empirical formula are used for the isomerization of butene-2 to butene-1.

It is to be understood that the above disclosure is by way of specific example and that numerous modifications and variations are available to those of ordinary skill in the art without departing from the true spirit and scope of the invention.

We claim:
1. A process for the conversion of butene-2 to butene-1 comprising contacting butene-2 with a magnesium chromium ferrite catalyst having the empirical formula

$$Mg_xCr_yFe_zO_4$$

wherein $x$ ranges from about 0.1 to about 3, $y$ ranges from greater than 0 to less than 2 and $z$ ranges from greater than 0 to less than 3, at a temperature of about 400° C. to about 550° C. wherein the butene-2 feed contains no more than about 0.15 mole of oxygen per mole of butene-2.

2. A process in accordance with claim 1 in which the magnesium chromium ferrite catalyst has the formula $Mg_xCr_yFe_zO_4$ wherein $x$ ranges from about 0.1 to about 2.0, $y$ ranges from about 0.1 to about 1.8 and $z$ ranges from about 0.25 to about 1.9.

3. A process in accordance with claim 2 which the magnesium chromium ferrite catalyst has the formula $Mg_xCr_yFe_zO_4$ wherein $x$ ranges from about 0.8 to about 1.3, $y$ ranges from about 0.2 to about 1.5 and $z$ ranges from about 0.5 to about 1.8.

4. A process in accordance with claim 3 comprising a mixture of said butene-2 and a gaseous inert diluent.

5. A process in accordance with claim 4 in which the inert diluent is steam in a molar ratio of steam to butene-2 of about 5 to 1 to about 20 to 1.

6. A process in accordance with claim 5 in which $x$ of the formula $Mg_xCr_yFe_zO_4$ is about 1.0

7. A process in accordance with claim 6 in which the magnesium chromium ferrite has the empirical formula of substantially about $MgCrFeO_4$.

References Cited
UNITED STATES PATENTS
3,450,787    6/1969    Kehl _____ 260—680

DELBERT E. GANTZ, Primary Examiner
V. O'KEEFE, Assistant Examiner